United States Patent
Krietzman et al.

(10) Patent No.: US 10,226,704 B2
(45) Date of Patent: *Mar. 12, 2019

(54) LEVERAGING ONLINE GAME GOALS AND ECONOMY TO DRIVE OFF-LINE BEHAVIORS

(71) Applicants: Mark Krietzman, Palos Verdes Estates, CA (US); Andrew Robinson, Virginia Beach, CA (US)

(72) Inventors: Mark Krietzman, Palos Verdes Estates, CA (US); Andrew Robinson, Virginia Beach, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/008,447

(22) Filed: Jan. 28, 2016

(65) Prior Publication Data

US 2016/0214017 A1 Jul. 28, 2016

Related U.S. Application Data

(60) Provisional application No. 62/108,603, filed on Jan. 28, 2015.

(51) Int. Cl.
*A63F 13/69* (2014.01)
*A63F 13/35* (2014.01)
*A63F 13/216* (2014.01)
*A63F 13/92* (2014.01)

(52) U.S. Cl.
CPC ............ *A63F 13/69* (2014.09); *A63F 13/216* (2014.09); *A63F 13/35* (2014.09); *A63F 13/92* (2014.09)

(58) Field of Classification Search
USPC ........................................................ 463/31
See application file for complete search history.

(56) References Cited

U.S. PATENT DOCUMENTS

| | | | | |
|---|---|---|---|---|
| 9,539,498 B1* | 1/2017 | Hanke | ...................... | A63F 13/00 |
| 9,669,318 B2* | 6/2017 | Etter | ...................... | A63F 13/85 |
| 2007/0038559 A1* | 2/2007 | Jung | ...................... | G06Q 20/10 |
| | | | | 705/39 |
| 2009/0070180 A1* | 3/2009 | Jung | ...................... | G06Q 40/02 |
| | | | | 705/38 |
| 2012/0079608 A1* | 3/2012 | Heatherly | ............... | G06Q 30/00 |
| | | | | 726/30 |
| 2012/0315986 A1* | 12/2012 | Walling | ................... | A63F 13/10 |
| | | | | 463/31 |
| 2012/0315987 A1* | 12/2012 | Walling | ................... | A63F 13/10 |
| | | | | 463/31 |
| 2013/0040714 A1* | 2/2013 | Rosing | .................... | A63F 13/65 |
| | | | | 463/7 |
| 2016/0364408 A1* | 12/2016 | Wu | .................... | G06F 17/30595 |

* cited by examiner

*Primary Examiner* — Pierre E Elisca

(57) ABSTRACT

A method and system to leverage a gaming infrastructure to encourage actions in a non-virtual environment to achieve virtual world benefits, comprising having a participant install an application on smart phone; the participant sets up an account on Gameco servers; application interacts with Gameco servers; Gameco servers provide participant opportunities to acquire virtual world benefits by visiting specific geographic locations which may include businesses; participants visits specified location; and, participant is provided a virtual reward by Gameco.

11 Claims, 3 Drawing Sheets

LEVERAGING ONLINE GAME GOALS AND ECONOMY TO DRIVE OFF-LINE BEHAVIORS

CROSS-REFERENCE TO RELATED APPLICATION

This application claims the priority to United States ("U.S.") Provisional Patent Application Ser. No. 62/108,603 filed Jan. 28, 2015 the disclosure of which is incorporated by reference herein in its entirety.

BACKGROUND OF THE DISCLOSURE

1. Field of the Disclosure

The present disclosure relates generally to a method and system to drive game player choices and actions in real world settings to achieve virtual world benefits.

2. Related Art

Online and mobile gaming in a virtual world is well now as our first person RPG (role playing games). In 2014 online gaming was estimated as a 40 Billion USD industry. AS such, online gaming contributes significantly to the US economy. Conversely, excessive immersion in an online gaming environment has, by some, been identified as a possible cause of fatigue, obesity and reclusion. Others note improvement in coordination, vision and problem solving may be associated with immersive gaming.

DISCLOSURE

Disclosed herein are systems and methods to encourage and/or direct actions and accomplishments in the non-virtual world visa via the goal of obtaining virtual world benefits, including but not limited to points, online game characters, accouterments, items, level-ups, advantages, prestige, fame, accolades, and collectibles.

Aspect of the methods and systems disclosed herein include the support for and/or promotion by Gameco of real world (non-virtual) positive conduct. Online gaming and gaming in general has been vilified by many for the seemingly habitual nature of some game environments to some persons. A method whereby Gameco encourages non-virtual world activities, and in particular positive activities, is a powerful tool to combat misperceptions about online gaming.

Aspects of the methods and systems disclosed herein include support for and/or promotion of combining online or virtual world activities with engagement of the real (non-virtual) world.

Aspects of the methods and systems disclosed herein include support for and/or promotion of local brick and mortar businesses and the related economies by combining online or virtual world activities with engagement of the real (non-virtual) world.

Aspects of the methods and systems disclosed herein include leveraging a gaming infrastructure to encourage actions in a non-virtual environment to achieve virtual world benefits, the method comprising: participant installs an application on smart phone; the participant may also set up an account on Gameco servers; application interacts with Gameco servers; Gameco servers provide participant opportunities to acquire virtual world benefits by visiting specific geographic locations which may include businesses; participants visits specified location; and, participant is provided a virtual reward by Gameco.

Aspects of the methods and systems disclosed herein include leveraging a gaming infrastructure to encourage actions in a non-virtual environment to achieve virtual world benefits, the method comprising: a participant using a computing device logs on to an application or website which communicates with Gameco servers; from time to time Gameco servers contact the participant via the computing device to give notice of an opportunity to achieve virtual rewards in a gaming environment or virtual world via going to a location and performing some action in the real world; if the participant chooses to meet the opportunity then he/she is identified at the location via location servers; Gameco servers then verify participant; and, Gameco servers determine if opportunity has been met and award virtual reward to participant. In some instances servers decisioning that additional opportunities exist for a specific participant at or near a specific location and Gameco notifies participant of the opportunity. In some instances Gameco servers contact client servers and request payment for virtual reward provided to participant.

Aspects of the methods and systems disclosed herein include leveraging a gaming infrastructure to encourage actions in a non-virtual environment to achieve virtual world rewards or items of desire, the method includes a participant using a computing device receive a notice from Gameco servers of an opportunity to act and achieve a virtual reward or benefit through actions outside of interacting with his/her computing device; participant selects an opportunity and performs an action in the real world; the participants is verified or confirmed as performing the activity by at least one of participants computing device and computing devices at client locations; Gameco servers then verify participant; and, Gameco servers determine if opportunity has been fulfilled and award virtual reward to participant. In some instances the method further comprising Gameco servers decisioning that additional opportunities exist for a specific participant at or near a specific location and Gameco notifies participant of the opportunity. In some instances Gameco servers and request payment for virtual reward for participant's activity. In some instances participant via computing device confirms to Gameco servers that he/she will chose an opportunity to act and Gameco servers record the confirmation. In some instances Gameco servers offer participant an enhanced or increased reward for making the confirmation after the participant completes the activity.

Aspects of the methods and systems disclosed herein include leveraging a gaming infrastructure to encourage commercial purchases in a non-virtual environment, the method includes a client contacts Gameco and agrees on an offer of virtual world benefits or rewards to be awarded participants in an online game for performing activities in a real world; Gameco servers populate the offer via a notification to the computing devices of at least some of the participants in the online game; if a participant performs the activity at any threshold level required a reward in the virtual game world is provided; and client pays Gameco for providing the virtual reward.

Aspects of the methods and systems disclosed herein include leveraging a gaming infrastructure to encourage commercial purchases in a non-virtual environment, the method includes a client contacts Gameco and agrees on an offer of virtual world benefits or rewards to be awarded participants in an online game for performing activities in a real world; Gameco servers populate the offer via a notification to the computing devices of at least some of the participants in the online game; and client pays Gameco for providing the notification.

The computing devices/smart devices disclosed herein operate with memory and processors whereby code is executed during processes to transform data, the computing devices run on a processor (such as, for example, controller or other processor that is not shown) which may include a central processing unit ("CPU"), digital signal processor ("DSP"), application specific integrated circuit ("ASIC"), field programmable gate array ("FPGA"), microprocessor, etc. Alternatively, portions DCA devices may also be or include hardware devices such as logic circuitry, a CPU, a DSP, ASIC, FPGA, etc. and may include hardware and software capable of receiving and sending information.

BRIEF DESCRIPTION OF THE FIGURES

The invention may be better understood by referring to the following figures. The components in the figures are not necessarily to scale, emphasis instead being placed upon illustrating the principles of the invention.

In the Figures, like reference numerals designate corresponding parts throughout the different views. All callouts and annotations are hereby incorporated by this reference as if fully set forth herein.

FURTHER DISCLOSURE

Figure 1:
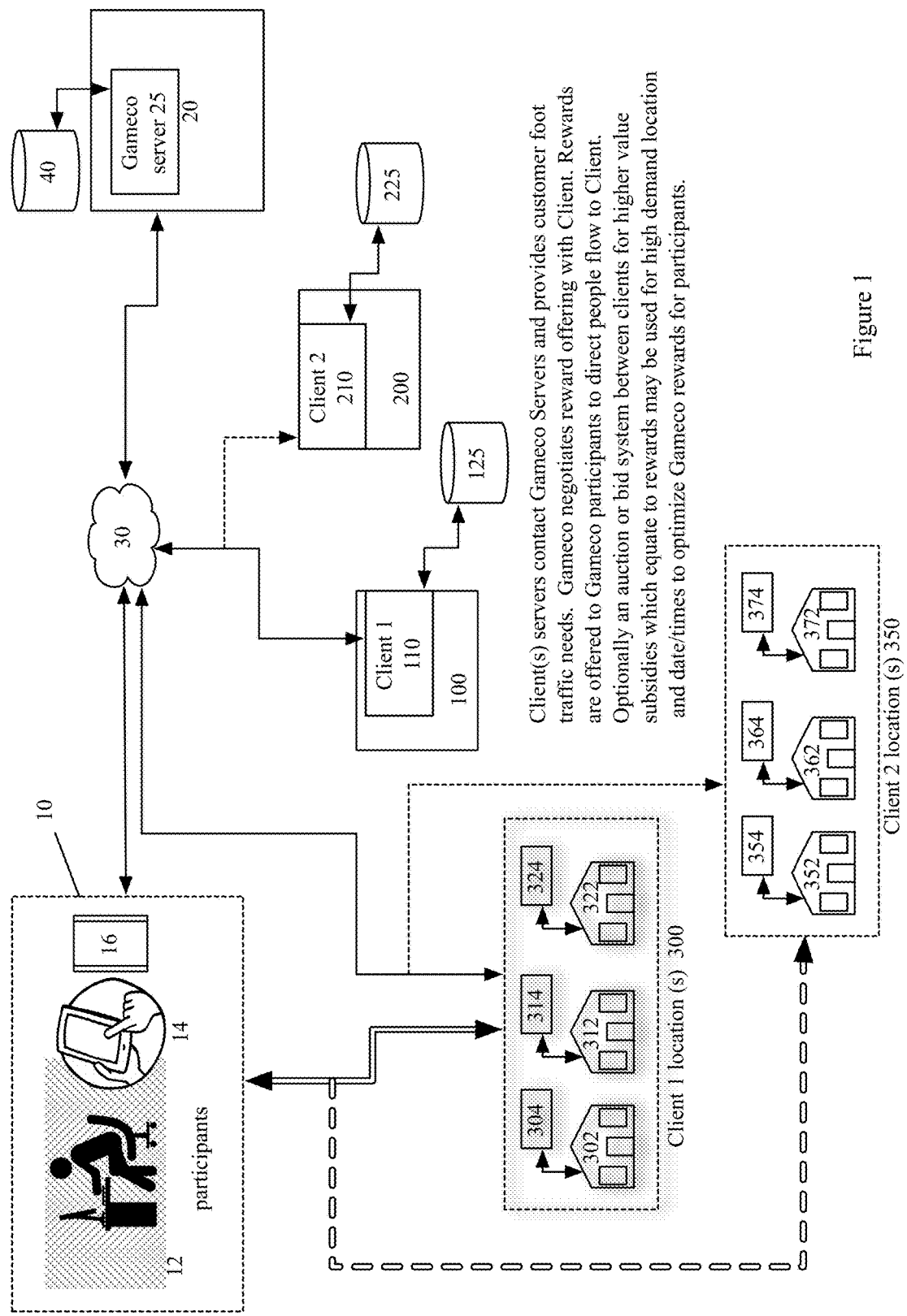
FIG. 1 is a representational diagram of aspects of a method and system whereby an online gaming platform or environment is utilized or leveraged to at least one of promote, motivate and urge behavior which may earn a participant benefits and rewards in the virtual or online world or economy and interactions between Gameco servers and client servers.

A scenario is established between a Gameco and one or more participants via computing devices in signal communication and clients who seek to utilize the online system as a mechanism to drive off-line activity.

Real world actions are actions beyond touching a keyboard, or mouse or touch screen to "surf" or use a computing device or interface to interact with websites or apps. Real world actions mean going somewhere and doing something physical that is not simply interacting with a computing device. However, part of the real world action may include using the computing device to receive notices, to authenticate and verify the activity or a part thereof.

In some exemplary implementations the off-line activity includes commercial behaviors such as shopping, traveling to a particular location. Behavior or action may be required or desired within a particular time frame. In some instances the virtual world reward (or value) associated with a behavior by the participant may be fixed. In some instances the virtual world reward (or value) associated with a behavior by the participant may be dynamic and change as a function of supply, demand, subsidy, sponsorship and the like. The commercial value to Gameco can be a function of the demand of clients. The commercial value to Gameco may in some instances be generally approximated by the difference between the online purchases of upgrades by participants who do not participate in off-line behavior to ear virtual world benefits versus those who do. The commercial value to Gameco may in some instances be generally approximated by the difference between the online purchases of upgrades by participants who do not participate in off-line behavior to earn virtual world benefits versus those who do plus advertising/marketing fees paid to Gameco for leveraging its infrastructure to drive behavior for clients. The commercial value to Gameco may in some instances be generally approximated by the difference between the online purchases of upgrades by participants who do not participate in off-line behavior to earn virtual world benefits versus those who do plus subsidies paid by clients to Gameco for the virtual benefits it distributes to drive behavior for clients.

In some exemplary implementations the valuation methodology may also be part of a auction like system wherein clients compete, in some instances, for participant behaviors they desire by outbidding a different client for Gameco to motivate via the on line environment.

Off-line activities may also be dynamic such as real world actions. Real world actions refer generally to actions that a participant completes in a non-virtual world environment and without interacting directly with the Gameco servers. Participant actions while interacting with the Gameco servers even the result of physical acts by the participant are not the non-virtual world actions referred to herein.

The scenario is beneficial to the participant as she/he is motivated by the opportunity to obtain a virtual world reward by spending some time in the non-virtual world including but not limited to travel, supporting local businesses, purchases, service (such as helping a political party get out vote) and the like.

Gameco derives revenue by linking one or more funding sources or subsidizers to its servers wherein actions or goals obtained by participants which earn participants rewards are paid for by such sources. Additionally, when participants activities i.e. visiting ABC sandwich shop is via the opportunity presented by Gameco, Gameco may also receive a percentage of the revenue collected by the "ABC" sandwich shop visa vie authentication of the participant by Gameco servers and in some instances assigning benefit and reward to participant after receiving confirmation of purchases via client servers.

Gameco also obtains a positive impressions in the society by actively offering opportunities to have participants spend some amount of time in a non-virtual world At a simplified level aspects of the system and method disclosed herein include utilizing hardware referred to as computing or smart devices which may include internet streaming systems, gaming system, desktop computers, laptops, tablets, smart phones, televisions to acquire, receive, measure or otherwise capture and then transmit via signal communication data associated with an participants.

It is appreciated by those skilled in the art that some of the circuits, components, modules, and/or devices of the system disclosed in the present application are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semiconductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying analog and/or digital formats without passing through a direct electromagnetic connection. These information paths may also include analog-to-digital conversions ("ADC"), digital-to-analog ("DAC") conversions, data transformations such as, for example, fast Fourier transforms ("FFTs"), time-to-frequency conversations, frequency-to-time conversions, database mapping, signal processing steps, coding, modulations, demodulations, etc.

FIG. 1 shows a participant 10 who may use one or more computing devices 12 (computer system) 14 (smart phone/tablet/handheld internet connected device) and 16 (car navigator system) in communication with Gameco 20 and Gameco servers 25 via a network 30. Gameco servers are shown connected to one or more databases 40 wherein information is stored. Participant sets up an account at Gameco servers or Gameco servers capture information from the Participant's computing device 12 (including but not limited to MAC address, IP address, serial number, geo-location, phone number, vehicle identification number, synthetic GPS, Cell ID, Wi-Fi, Terrestrial Transmitters) to identify the Participant which may include the location thereof and create records about the Participant. The communication may be intermittent and the participant may utilize an application on the computing device and that application is in intermittent contact with Gameco servers.

In a simplified operation Gameco 20 communicates with at least one client 100. The communication in some instances is client server 110 to Gameco servers 25 wherein Gameco rule and decision engines schedule parameters of client 100 desired participant behavior with Gameco which in turn determines what segment, if not all, of its population of participants to broadcast or push messaging to attempt to motivate behavior outside the virtual world or gaming world interaction whereby the participant 10 can achieve benefits in the virtual world for such real world actions. Client servers also may provide all or some of their stored data (in database(s) 225) on sales, customer traffic, inventory, demographic of their customers, zip codes, and traffic flow during time periods to Gameco servers 25 whereby Gameco servers determine identify opportunities to motivate participants to interact with client real world locations 300 in general and specific ways. Real world location 300 may be as large as a geographic region or as small as a store (302,312, 322) and the location(s) have servers (304, 314 and 324) which are in signal communications with one or more of Client servers 110, Gameco servers 25 and participants computing devices (12,14 and 16).

Gameco servers act to inform, motivate, urge some population of participants to behave in a desired way in response to Gameco 20 activities on behalf of client 100. The behavior may be travel to real world location(2) 300 or purchases at real world locations.

In either instance Gameco servers require authentication of participant behavior to provide participant a virtual world benefit for the behavior. A non-exclusive list of authentication means include, voice recognition at client location via client server. Facial recognition via client server. Other biometric authentication via client severs. Geolocation via participant computing device. A changing image such as a clock, glyph, code or the like displayed at client and taken with participants computing device to compare the image and its encoded data (i.e. time, glyph code etc) with participant geolocation and computing device identity to validate. A specific code provide participant when he/she checks in at client location 300. In other instances when a participant makes a purchase at client location 300 if the participants computing device (or the participant) can provide client servers authentication data whereby Gameco servers have a record of participant purchase and thereby can: 1. Assign benefit or reward offered to participant for the purchase; and 2. Collect subsidy or payment from client for participant behaving to purchase at location.

In a less simple variation Gameco 20 is in communication with at least a first clients 100 and a second client 200. The second clients having servers 210 and database(s) 225. In some instances both the first and the second client have Gameco working to drive participants to clients locations. In this example the second client real world location 350 may be as large as a geographic region or as small as a store (352,362, 372) and the location(s) have servers (354, 364 and 374) which are in signal communications with one or more of Client servers 110 and Gameco and participants computing devices (12,14 and 16). Online games may include online gambling as well as role pay and other games.

In an auction or competitive process wherein first and second clients are determined to be competing Gameco may direct a bidding or auction for time, date or location wherein Gameco may limit for which client during what time it will act to motivate behavior through its online game.

Figure 2:
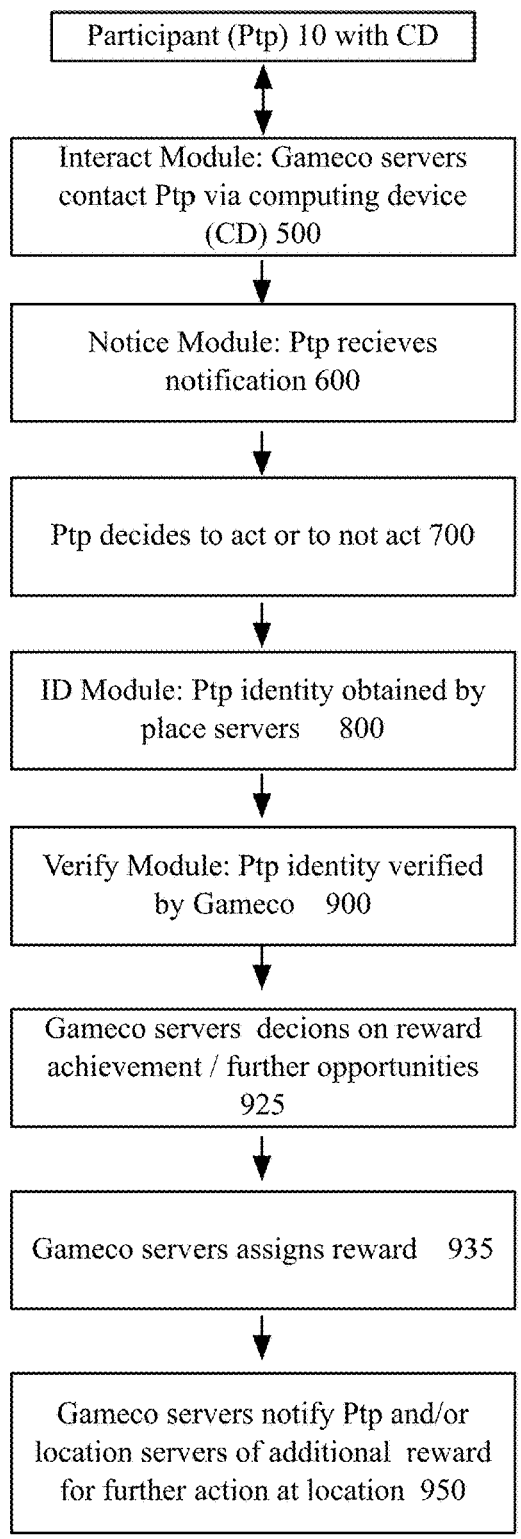
FIG. 2 is an overview diagram of aspects of an exemplary method and system wherein participants interaction with Gameco servers and location servers as well as location server interactions with Gameco servers.
Figure 3:
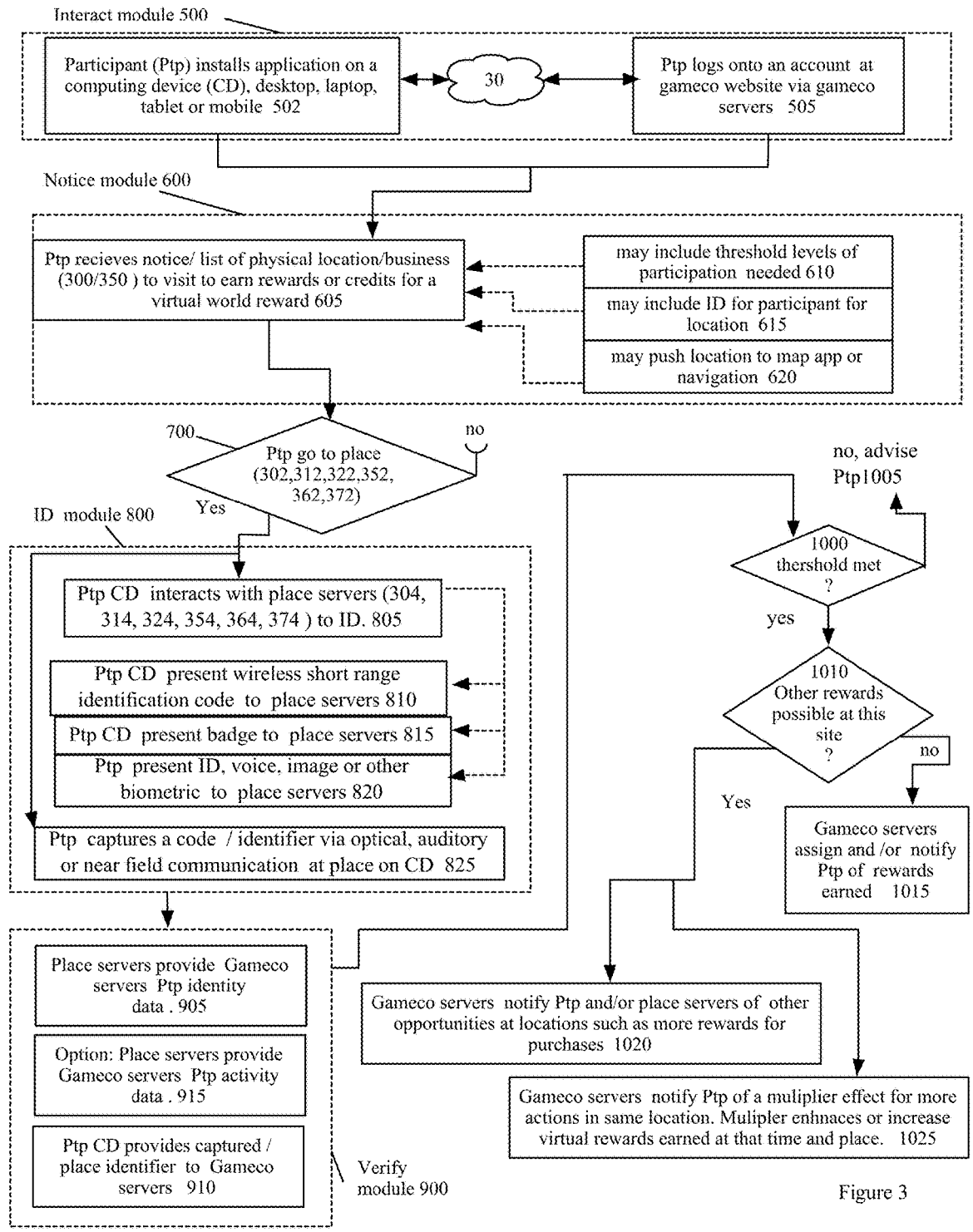
FIG. 3 is an overview diagram of aspects of an exemplary method and system wherein participants interaction with Gameco servers and location servers as well as location server interactions with Gameco servers.

FIGS. 2 and 3 are diagrams showing aspects of several methods and systems disclosed herein including process steps, decisioning and modules for interaction, notification, identification, and verification.

Participant 10 interacts with Gameco servers via the interaction (or communication) module 500. Via the interactions with Gameco servers 25, participant visa vie a computing device will receive notifications (from the Notice module 600) of opportunities to earn virtual rewards via behavior in the real world. Gameco servers may chose to provide connected opportunities wherein the push notification may be shared with designated person, via there computing devices, in accordance with agreements to have their conduct in the real world help earn virtual world rewards to the participant. One non limiting example may be a friend, spouse or parent travelling to the location and/or making purchases wherein the virtual benefit or reward is distributed to the participant.

A participant will decide whether or not to act 700. If the participant acts and goes to the specified location then via an identification (ID) module 800 the servers at the location (place) the participant traveled to agglomerate/capture or receive Identification information of participant.

The place servers then provide the identification to the Gameco servers which utilize a verification module 900 to determine if the participant is authenticated for the rewards sought.

Gameco servers thereafter decide, applying rule and decision engines, on whether the reward requirements (which may include thresholds) have been met and whether and other opportunities exist at that location at that time 925.

If no other opportunities exist then Gameco servers assign reward. Gameco servers may also notify participant of the achievement. If additional opportunities for the identified and verified participant in or about the location, or on a route the participant is taking away from the location exist Gameco servers may notify participant and/or location servers of the opportunities. Additionally, opportunities may be purchasing goods or service at a client location.

In some exemplary implementations, aspects include a interaction module wherein a participant 10 becomes involved with the online game by one or more of installing or using an application on one of his/her computing devices 502 and using a network 30 to interact with Gameco servers or logging on, with a computing device via a network 30, to Gameco website/servers 505.

Once a participant has become a involved with the online Gameco a database containing information about that participant is populated and updated by Gameco servers. Based on criteria set by Gameco servers, which may also be limited by participants assets, achievements while playing the online game(s), age, preference, physical location or other factors will receive one or more notifications from Gameco notification module 600 (from Gameco servers 25) regarding a physical real world location (300/350) to be at to obtain a virtual reward. For Gameco the locations (300/350) represents locations of clients (100/200) for who Gameco is leveraging its online community and infrastructure to drive real world traffic and or sales.

The notification module may be tailored to target specific participants based on criteria such as age, location, user preference, economic profile, virtual world activity or conduct, gender, habits, likes/dislikes, buddies, groupings and the like. The Gameco servers select and/or filter a population of participants and notify them of opportunities 605. Optionally, participant may select an opportunity to advise Gameco servers he/she is going to attempt to achieve the reward. The optional notice back from participant is useful for Gameco servers to dynamically adjust the number of notification it sends out in a given time frame. Additional rewards may be assigned to participants who respond with a notice back and who actually complete the real world behavior.

Optionally, there may also be a requirement of a threshold level of participation for the participant to achieve a virtual reward for real world activity and notice of same may be given 610. The threshold requirements may also be used as a criteria to filter out or identify participants who are more likely to be responsive to the notification and hence become a higher value participant for a particular response and/or for such a system and method.

Optionally, Gameco servers send or provide a virtual badge such as a specific or unique ID or code to a participant computing device for each opportunity 615 offered. The badge can be specific and used to track participant actions and therefore used to further expand Gameco database on each participant to better select responsive populations.

Optionally, Gameco servers may push or notify a map application or navigation system which participant has specified or provided access to Gameco to with the location or directions to the location(s) 620.

Once notified a participant has the opportunity to make a decision 700 to act in the real world and go to a physical location (302, 312, 322, 352, 362, 372) and/or interact with servers (304, 314, 324, 354, 364 374) at that location. Once a participant arrives at a location (302, 312, 322, 352, 362, 372) the participant (or designee) needs to be identified to meet the opportunity requirements to achieve virtual rewards for real world conduct.

The participant interaction with place servers (304, 314, 324, 354, 364 374) to have participant or designee identified 805. Means of identification include but are not limited to: Participant's computing device present an RFID tag, or a wireless short range identification code to place servers 810. Participant presents a physical badge such as a bracket with an RFID tag and/or a virtual badge containing specific information provided by Gameco servers to participant computing device that identifies participant with respect to the opportunity 815. The participant may present his/her biometrics such as voice, image, breath, DNA, fingerprint, retinal scan and the like 820 to support identification. Alternatively, the participant may identify the location via a code or identifier provided at the location. Such codes may be communicated to the participants computing device via short range signal communication wirelessly, or it may be captured by user via camera in computing device or speakers. Location codes may be auditory or visual or RF, the location may set up a screen that displays images or codes which can be captured and via time comparison of capture time and code provided Gameco servers can decision if the participant is at the location at the designated time. Identification data from the participants computing device known to Gameco servers can also be part of the identification.

After the participant (or designee) has been identified at the location a verification procedure takes place wherein the Gameco servers one of receive the captured data associated with participant by place servers 905 or captured place (location) data is provided by participants computing device to Gameco servers 910. Optionally, place servers may provide participant activity data including but not limited to time at location, geographic movements at location, and purchases at location to Gameco servers 915.

Gameco servers after receiving the verification of participant connection with location data then decision if any necessary threshold(S) have been met 1000. If not met then Gameco servers contact participant advising he/she of same. If threshold(s) met Gameco servers determine if additional rewards/benefits are available at or near the location 1010. If no then Gameco servers award and/or notify participant of the virtual reward obtained 1015. If other opportunities are available Gameco servers notify participant of such opportunities 1020. Gameco servers may also notify participants of a multiplier effect for more actions in same location. A multiplier can, for a time or location limited period, enhances or increase virtual rewards earned 1025.

Turning back to FIGS. 1 and 2 client(s) servers 110/210 are in communication with Gameco servers 25. In a simplified exemplar client servers (or client 100/200) contact Gameco 20 (or Gameco servers 25) and request that a notice be distributed to all or some of the population of participants 10. The notification includes at least one of location of opportunity, date of opportunity, and time of opportunity. The notice may further include threshold activity required. A threshold activity will change based on client needs and Gameco agreements.

A few non-limiting examples which in no way are intended to limit the scope of the inventions may include be at location for "X" minutes, or go to a specified department of a store at the location, or be at location between hours of "##:##" and "##:##", or find the yellow troll doll and take a picture of it next to a clock, or buy the "XYZ" subway sandwich and a large soda, or open a checking account at "ABC" bank.

Gameco and clients may negotiate on the time(s) and location(s). Gameco and clients agree on a value of one or more of participant notification and participant activity. The value may be reflected in virtual rewards which are awarded the participant and paid for or subsidized by client(s). Data of participant identification from the notice module 600 can be used to provide a count of the number of participant contacted. Notice back from participants may also be used as a measure of the initial response of participants to a particular opportunity. The raw data of notice back can later be compared to the actual activities of participants (data from the identification module 800) to further determine the return on investment (ROI) for clients who pay Gameco for notification. The data may also be sued by Gameco to refine the opportunity notice to achieve higher actions on the part of participants.

The system may can be dynamic and versatile. For example, if client has an excess of inventory of sandwiches or t-shirts at a location a notification may be limited to participant acquiring those goods. Alternatively, if a client location has a lull in foot traffic during a particular time frame the location (for example a big box retailer, amusement park or a Mall) may offer rewards for the participant who traverses the location which may be verified with GPS and/or by participant interacting with check-in areas to capture a digital image or sound or code and having Gameco servers verify participant activity.

If multiple clients (100/200) seek the same population for notice that may be used to create an auction or bidding process wherein the client offering to provide more revenue to Gameco for virtual rewards which will be awarded to participants can compete for the notice. Optionally, the client may offer a greater subsidy of virtual goods thereby offering participant a greater reward visa vie Gameco.

Additionally, a client may offer a percentage of sales made to participants who have been notified by Gameco and who make purchases at location. Verification of the sale or purchase may be via linking the sale to the participant via participant computing device (which can self authenticate to Gameco) and/or via client server which interfaces with at least one of participant and participant's computing device to provide Gameco server adequate data to assign virtual reward to proper participant.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A method to leverage a gaming infrastructure to encourage actions in a non-virtual environment to achieve virtual world rewards or benefits, the method comprising:
   a participant using a computing device interacts with an application or website which communicates with Gameco servers;
   from time to time Gameco servers contact the participant, via the computing device, to notify the participant of an opportunity to achieve virtual rewards in a gaming environment or virtual world via visiting a specific geographical location in the non-virtual environment and performing some action in the non-virtual environment;
   participant is verified as participating;
   Gameco servers determine if opportunity has been met and award virtual reward to participant,
   wherein verifying that the participant is participating includes confirming that the participant is performing the activity by at least one of the computing device of the participant, a computing devices of a client at the specific geographical location, or both.

2. The method of claim 1, wherein verifying that the participant is participating includes the participant is identified at the specific geographical location via location servers.

3. The method of claim 1, the method further comprising Gameco servers contact client servers and request payment for virtual reward provided to participant.

4. A method to leverage a gaming infrastructure to encourage actions in a non-virtual environment to achieve virtual world rewards or benefits, the method comprising:
   a participant using a computing device interacts with an application or website which communicates with Gameco servers;
   from time to time Gameco servers contact the participant, via the computing device, to notify the participant of an opportunity to achieve virtual rewards in a gaming environment or virtual world via visiting a specific geographical location in the non-virtual environment and performing some action in the non-virtual environment;
   participant is verified as participating;
   Gameco servers determine if the opportunity has been met and award virtual reward to participant;
   Gameco servers determine that additional opportunities exist for a specific participant at or near the specific geographical location; and
   Gameco notifying participant of the opportunity.

5. A method to leverage a gaming infrastructure to encourage actions in a non-virtual environment to achieve virtual world rewards or benefits, the method comprising:
   a participant using a computing device interacts with an application or website which communicates with Gameco servers;
   from time to time Gameco servers contact the participant, via the computing device, to notify the participant of an opportunity to achieve virtual rewards in a gaming environment or virtual world via visiting a specific geographical location in the non-virtual environment and performing some action in the non-virtual environment;
   participant is verified as participating;
   Gameco servers determine if opportunity has been met and award virtual reward to participant;
   Gameco servers determining that additional opportunities exist for a specific participant at or near a specific geographical location; and
   Gameco notifies the specific participant of the opportunity.

6. The method of claim 5, the method further comprising Gameco servers verifies participant's additional opportunity activity.

7. The method of claim 6, the method further comprising Gameco servers contact client servers and request payment for virtual reward for participant's additional opportunity activity.

8. The method of claim 5, the method further comprising participant, via computing device, confirms to Gameco servers that participant will chose an opportunity to act and
   Gameco servers record the confirmation.

9. The method of claim 8, wherein Gameco servers offer participant an enhanced or increased reward after the participant completes the activity, for confirming that the participant will chose an opportunity to act.

10. The method of claim 5, wherein the participant sets up an account on Gameco servers.

11. A method to leverage a gaming infrastructure to encourage commercial purchases in a non-virtual environment, the method comprising:
- a client contacts Gameco and agrees on an offer of virtual world benefits or rewards to be awarded participants in an online game for performing activities in a real world;
- Gameco servers populate the offer via a notification to the computing devices of at least some of the participants in the online game, wherein the participant must perform the activity at a threshold level to obtain a reward in the virtual game world;
- client pays Gameco for providing the notification; and
- client pays Gameco for providing the virtual reward.

* * * * *